United States Patent [19]
Park

[11] Patent Number: 5,953,489
[45] Date of Patent: Sep. 14, 1999

[54] TRANSPORT BIT STREAM RECORDING/ REPRODUCING APPARATUS AND METHOD

[75] Inventor: Tae Joon Park, Seoul, Rep. of Korea

[73] Assignee: LG Electronics, Inc., Seoul, Rep. of Korea

[21] Appl. No.: 08/731,463

[22] Filed: Oct. 15, 1996

[30] Foreign Application Priority Data

Oct. 16, 1995 [KR] Rep. of Korea .................... 95-35701

[51] Int. Cl.⁶ .......................... H04N 5/917; H04N 5/926
[52] U.S. Cl. ............................... 386/109; 386/124
[58] Field of Search ................................ 386/109, 111, 386/112, 46, 27, 33, 124, 113, 40, 21; 348/387, 390; H04N 5/917, 5/926

[56] References Cited

U.S. PATENT DOCUMENTS

| | | | |
|---|---|---|---|
| 4,914,618 | 4/1990 | Dodge | 364/900 |
| 5,383,182 | 1/1995 | Therasse et al. | 370/60 |
| 5,673,358 | 9/1997 | Boyce | 386/112 |
| 5,801,781 | 9/1998 | Hiroshima et al. | 348/441 |

*Primary Examiner*—Robert Chevalier
*Attorney, Agent, or Firm*—Loeb & Loeb

[57] ABSTRACT

A transport bit stream recording apparatus for a digital recorder having an integrated receiver decoder includes a device for converting a first variable rate bit stream input through the integrated receiver decoder to a constant rate bit stream, and a device for recording the constant rate bit stream.

24 Claims, 11 Drawing Sheets

TRANSPORT BIT STREAM RECORDING/REPRODUCING APPARATUS AND METHOD

BACKGROUND OF THE INVENTION

1. Field of the Invention

The present invention relates to a digital recorder, and more particularly, to a transport bit stream recording/reproducing apparatus and method. Although the present invention is applicable to a variety of different devices, is especially applicable to a digital video cassette recorder (DVCR).

2. Discussion of the Related Art

Figure 1:
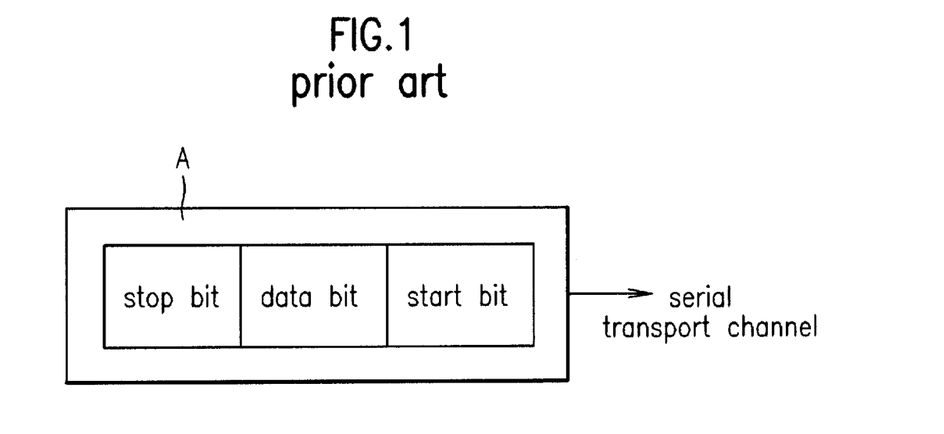
FIG. 1 illustrates a prior art format of transport data in an unit of bit stream.

Generally speaking, when information to be transferred through a communication channel is a bit stream of a variable rate, each transport unit of the information is transferred along with a start bit and several stop bits, as shown in FIG. 1. The number of stop bits is controlled to allow the channel to have a desired transport rate.

Figure 2:
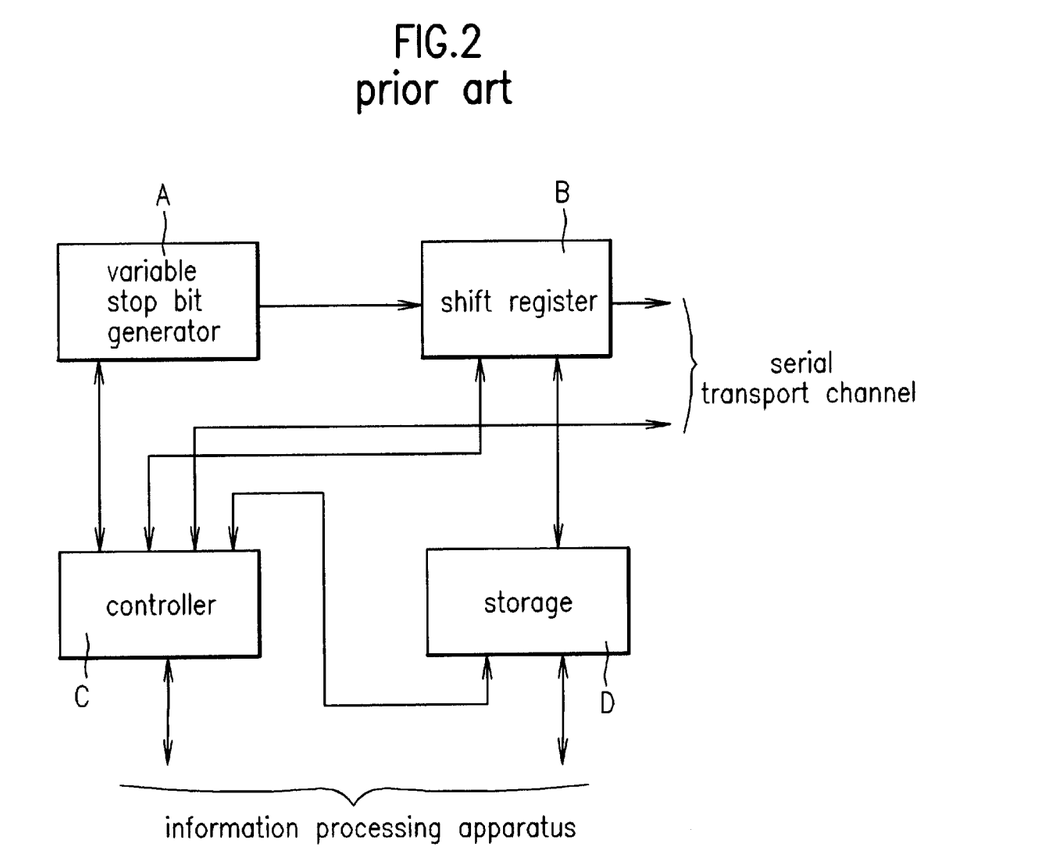
FIG. 2 is a block diagram for generating the transport data format of FIG. 1.

There has been suggested a method for controlling the number of stop bits in which, as shown in FIG. 2, a controller C controls a variable stop bit generator B, shift register A and storage D according to a control signal applied from an information processing apparatus. Thus, an appropriate control signal is transported to a serial communication channel. Here, the control signal transferred to the serial communication channel varies with the kind of serial communication channel.

Storage D temporarily stores information input from the information processing apparatus prior to its transmission through the serial communication channel. In other words, the information input from the information processing apparatus is stored in the storage, and then it is transported to shift register A according to the control signal received from or transmitted to controller C.

Variable stop bit generator B generates a stop bit according to the control signal received from or transmitted to controller C, as shown in FIG. 1. Shift register A stores and sequentially outputs the data bit from storage D and the stop bit generated from variable stop bit generator B according to the control signal received from or transmitted to controller C.

The above operation converts data to a transport data format and transfers it to a serial communication channel. Information is first recorded in storage D from an information processing apparatus. Here, the clock frequency used may be different from that used in transportation via the communication channel.

The information written in storage D from the information processing apparatus is transmitted to the serial communication channel via shift register A. If there is no data bit to be transmitted, the stop bit generated from variable stop bit generator B is transferred to the serial communication channel via shift register A. Data is always transferred through the serial communication channel.

The above method varies the actual transport rate through the communication channel within a range smaller than the information transport rate while maintaining uniformity of the transport rate. The above method is one way (embodiment) of transferring a variable rate bit stream through the communication channel.

In another method (embodiment) of transferring the variable rate bit stream, there has been suggested a method for multiplexing several variable rate bit streams for digital broadcasting through a variety of broadcasting media such as aerial wave broadcasting, Grand Alliance (which is the U.S. standard in HDTV), cable broadcasting, and satellite broadcasting. Here, the multiplexed bit streams have a constant rate bit stream, which becomes equal to the information transport rate of the broadcasting channel.

When the bit stream transferred at a variable rate is to be recorded or reproduced via a digital recording/reproducing medium, it must be converted into a constant rate bit stream because the medium is capable only of recording the constant rate bit stream. One of the methods for converting the variable rate bit stream into the constant rate bit stream was presented in U.S. Pat. No. 4,914,618. According to this method, the recording rate for the digital medium is fixed at an instant maximum transport rate, and the stop bits are added to the variable rate bit stream. However, this is inefficient because it sharply reduces the net recording capacity of the digital recording medium.

In order to convert the variable rate into a constant rate while maximizing the net recording capacity of the digital medium, a buffer such as an FIFO may be applied. According to this method, the variable rate bit stream is written in the FIFO, and read out at a constant rate. This method may cause errors due to information needed for clock synchronization used in decoding the bit stream, using information contained in the bit stream, making the decoding process unstable in a decoder using the information.

In order to stabilize the method using the FIFO buffer, a time stamp may be added, which is employed in a communication network such as in an asynchronous transfer mode (ATM). A method for adding time stamp in the communication network was suggested in U.S. Pat. No. 5,383,182. Here, a time stamp generator allocates a time stamp to the respective units of information transportation. Adding time stamp to the digital recording medium greatly increases the additional recording capacity required in recording the time stamp. More specifically, a transport packet (the unit of transportation) has a size of 188 bytes, and the time stamp allocated to the transport packet is about 4–6 bytes so that the overhead from the time stamp is 2.1–3.1%.

In short, the above-discussed methods require the variable rate bit stream to be converted into a constant rate bit stream when the variable rate bit stream is recorded or reproduced through a digital recording/reproducing medium. For this, first, there is a method for fixing the recording rate to the digital medium at an instant maximum transport rate and adding the stop bits to the variable rate bit stream. This method is unrealistic, however, because it sharply reduces the net recording capacity of the digital recording medium and makes it difficult to design the hardware for high-speed recording/playback.

Second, there is a method for writing the variable rate bit stream in an FIFO which draws out the oldest data from a data table, and reads it out at a constant rate bit stream. This method maximizes the net recording capacity of the digital recording medium, but causes errors due to information needed for clock synchronization used in decoding the bit stream, i.e., in restoring it for display, using information contained in the bit stream. For this reason, the decoding may become unstable in a decoder using such information, and it may be difficult to obtain compatibility with other sets.

Third, there is a method for adding a time stamp to a transport packet unit. This method yields a stabler operation than the second method, but increases its capacity because the transport packet has a size of 188 bytes and the size of the time stamp is 4–6 bytes, causing the overhead of the time stamp to be 2.1–3.1%.

In the digital recording/reproducing medium, the variable rate bit stream must be converted to a constant rate bit stream. Thus, a technique is needed to eliminate or minimize malfunctions in reproduction which may be caused by rate conversion and recording. However, in recording or reproducing using the above rate conversion of bit stream, the aforementioned problems arise. Therefore, development of a novel method is required for rate conversion of bit stream.

SUMMARY OF THE INVENTION

Accordingly, the present invention is directed to the transport bit stream recording/reproducing apparatus and method that substantially obviates one or more of the problems due to limitations and disadvantages of the related art.

An object of the present invention is to stably perform playback/picture recovery when converting a variable rate bit stream into a constant rate bit stream and to obtain compatibility between sets.

Another object is to provide a transport bit stream recording/reproducing apparatus of a digital magnetic recording medium for minimizing the amount of data additionally recorded on a cassette tape to maximize the recording capacity thereof.

Another object of the present invention is to provide a transport bit stream recording/reproducing apparatus for a digital magnetic recording medium where a variable rate bit stream transferred to the digital magnetic recording medium is converted into a constant rate and recorded on cassette tape.

Another object of the present invention is to provide a transport bit stream recording/reproducing apparatus for a digital magnetic recording medium where, for playback, a constant rate bit stream recorded on cassette tape is reversely converted into a variable rate bit stream equal to the transferred bit stream, thereby stably recovering the picture and sound.

A further object of the present invention is to provide a transport bit stream recording/reproducing apparatus for a digital magnetic recording medium for minimizing overhead data including time stamp.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transport bit stream recording apparatus of a DVCR having an IRD comprises means for rate-converting a variable rate bit stream input through the IRD into a predetermined rate bit stream; and means for recording the converted bit stream.

In another aspect of the present invention, a transport bit stream reproducing apparatus of a DVCR having an IRD comprises means for reproducing a predetermined rate bit stream recorded in the DVCR; and means for converting the reproduced bit stream into an original variable rate bit stream for the purpose of its stable recovery.

In another aspect of the present invention, a method of recording a transport bit stream in a DVCR comprises the steps of initializing recording start with a transferred bit stream made up of a transport packet and a time stamp clock; initializing the value of time stamp to "0"; deciding whether the transport packet has arrived or not; counting up the value of time stamp, using the time stamp clock, if the transport packet did not arrive; outputting a current time stamp value when the next transport packet has arrived; and finishing the recording according to a user's key input.

In a further aspect of the present invention, a method of reproducing a transport bit stream in a DVCR comprises the steps of initializing reproducing start with a transferred bit stream made up of a transport packet and a time stamp clock; deciding whether the value of a reproduced time stamp and a counted value of time stamp are identical; counting up the value of time stamp, using the time stamp clock, if the time stamp values are not identical; outputting the reproduced time stamp value when the time stamp values are identical; and finishing the reproducing according to a user's key input.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENTS

Reference will now be made in detail to the preferred embodiments of the present invention, examples of which are illustrated in the accompanying drawings.

Hereinafter, preferred embodiments of a transport bit stream recording apparatus and its controlling method for a digital magnetic recording medium of the present invention will be described with the attached drawings.

First Embodiment

Figure 3:
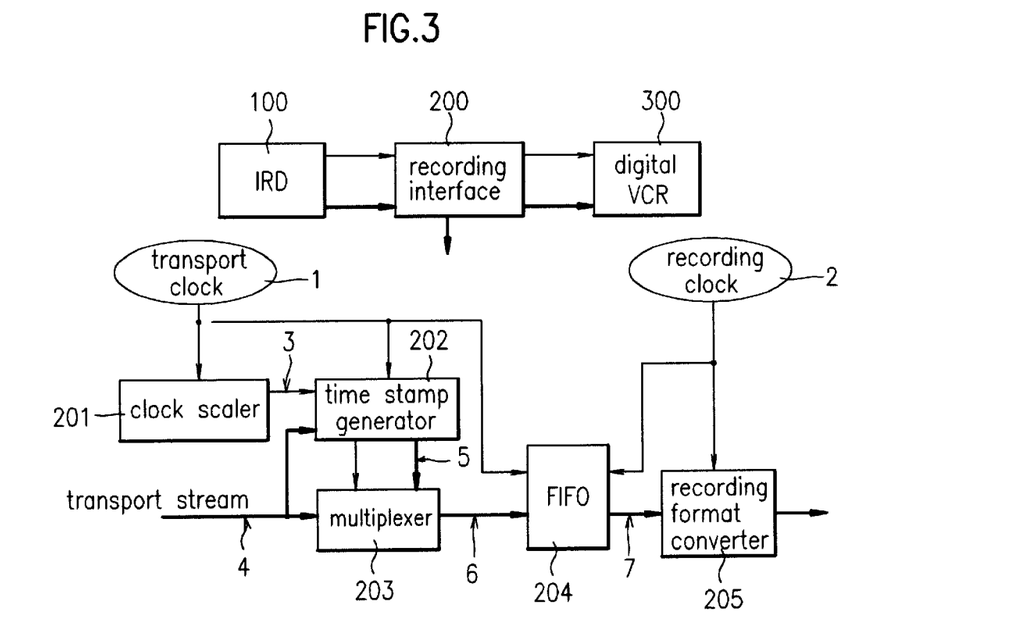
FIG. 3 is a detailed block diagram of a first embodiment of a recording interface of the transport bit stream recording apparatus of digital magnetic recording medium according to the present invention.

Referring to FIG. 3, the first embodiment of the transport bit stream recording apparatus of the present invention includes an integrated receiver decoder (IRD) 100 for receiving and decoding a digitally broadcast program, converting it to an analog signal to be displayable through a monitor, and transferring the program digitally with another digital hardware. A digital VCR 300 (one type of the digital hardware) records the program transferred from IRD 100 by a user so that the program can be viewed at a predetermined time after the broadcasting. A recording interface 200 converts the variable rate bit stream transferred from IRD 100 to a constant rate bit stream, and records it in the digital VCR 300. Here, the digital data transferred to digital VCR 300 from IRD 100 is generally a variable rate bit stream.

The digital data recording/reproducing apparatus such as digital VCR 300 can only record constant rate bit stream. Thus, there is a need to convert the variable rate bit stream to a constant rate bit stream. Here, recording interface 200, connected between IRD 100 and digital VCR 300, converts the variable rate bit stream to the constant rate bit stream, and records it in digital VCR 300.

As shown in FIG. 3, recording interface 200 includes a transport clock generator 1 for generating a transport clock to the transferred variable rate bit stream. A time stamp generator 202 generates time stamp information used in reproducing the constant rate bit stream recorded in digital VCR 300 to the variable rate bit stream. A clock scaler 201 outputs a clock signal in which the clock signal output from transport clock generator 1 is multiplied by a constant N, and generates a predetermined magnitude of clock division so that a time stamp is generated from time stamp generator 202. A multiplexer 203 multiplexes the variable rate bit stream and the time stamp generated from time stamp generator 202 through time division. A FIFO 204 converts the variable rate bit stream multiplexed in multiplexer 203 to a constant rate bit stream. A recording format converter 205 converts the constant rate bit stream output from FIFO 204 to a bit stream suitable for recording in digital VCR 300. A recording clock generator 2 generates a recording clock used in recording the bit stream output from the recording format converter 205 in digital VCR 300.

According to the operation of the above stated recording interface 200, the transport clock generated from transport clock generator 1 is scaled to a predetermined magnitude of clock division in clock scaler 201, and applied to time stamp generator 202.

Time stamp generator 202 generates a time stamp for the variable rate bit stream input by the output clock of clock scaler 201. The generated time stamp is applied to multiplexer 203, multiplexed with the incoming variable rate bit stream, and then applied to FIFO 204. FIFO 204 stores the applied signal, and outputs it as the constant rate bit stream to the recording format converter 205. According to the recording clock of recording clock generator 2.

Recording format converter 205 converts the applied constant rate bit stream to a format recordable on the digital medium of digital VCR 300. In reproducing the transferred variable rate bit stream, the time stamp information required in the recovery of the original variable rate bit stream is added thereto, and input to a buffer such as FIFO 204 so that the constant rate bit stream is extracted from the output of FIFO 204.

Figure 4A:
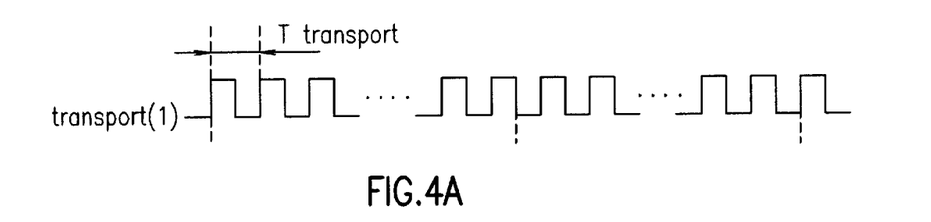
FIGS. 4A and 4B are timing diagrams of clock scaler I/O signals of FIG. 3.
Figure 4B:
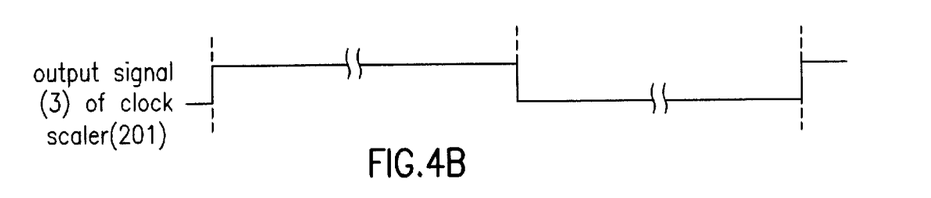

Referring to FIG. 4, transport clock generator 1 needs as long a time as T to transport one byte (or bit). Here, clock 3 for the time stamp (the output signal of clock scaler 201) has timing waveforms shown in FIGS. 4A and 4B. In FIGS. 4A and 4B, the output signal 3 of clock scaler 201 is a signal in which transport clock signal 1 is divided by N. The period $T_{time-stamp}$ of clock scaler 201 becomes N times the T transport. In other words, $T_{time-stamp}=N \times T$.

Clock scaler 201 is added so that the variable rate bit stream becomes a burst of a series of signal regarded as one unit according to a specific reference in data transport in units of transport packet, that is, the transport unit of N bytes. When the time stamp is counted in unit of transport packet, the amount of data required in coding the time stamp signal cam be reduced.

Figure 5:
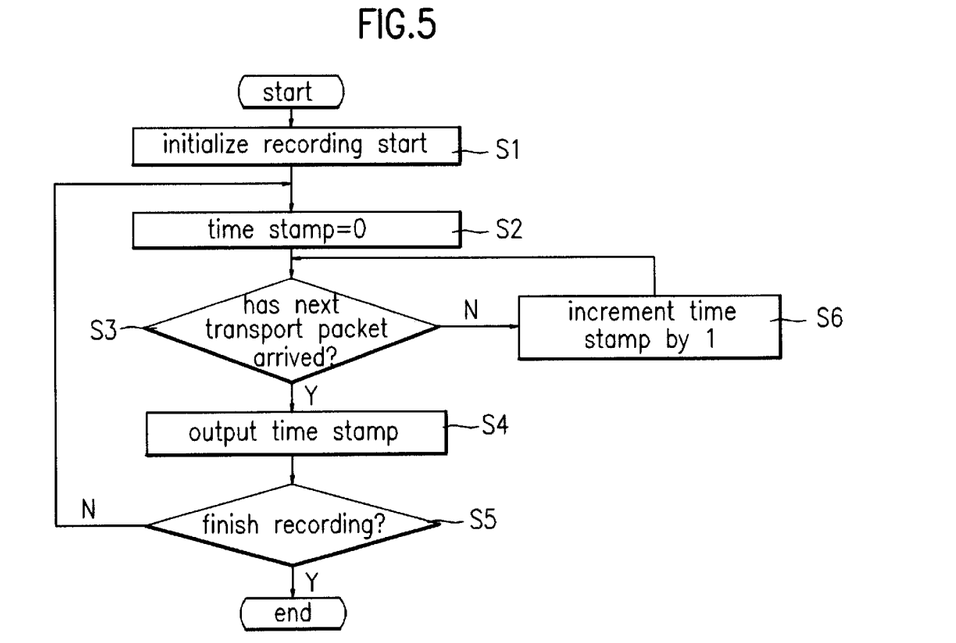
FIG. 5 is a flowchart for generating a time stamp from the time stamp generator of FIG. 3.
Figure 6:
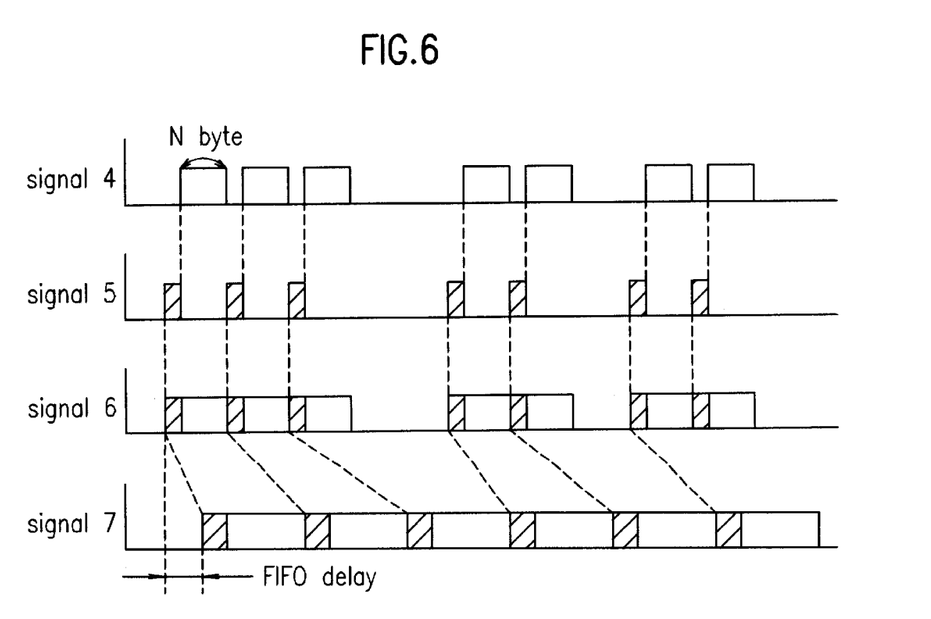
FIG. 6 is an output timing diagram for the respective portions of the recording interface of FIG. 3.

FIG. 5 shows a flowchart of the operation of time stamp generator 202, which suggests a method for reducing the amount of data required in loading the time stamp signal. This method is made in such a manner that the difference of transport time between two nearby transport packets is coded with the time stamp. FIG. 6 is an output timing diagram of the respective portions of recording interface 200.

Referring to FIG. 5, when the clock for time stamp from clock scaler 201, and the variable rate bit stream are input to time stamp generator 202, the initialization of recording start and the initialization of the time stamp to value "0" are performed in steps $S_1$ and $S_2$. After the signal (signal 5 in FIG. 6) from which the time stamp is output, the time stamp is reset to "0" in step $S_2$.

It is determined in step $S_3$ whether the next transport packet has arrived from signal 4 of FIG. 6. If not, the time stamp increases by "1" in step $S_6$ to update the difference in the transport time between packets until the next transport packet arrives. When the next transport packet does arrive, the time stamp for the respective transport packets is output in $S_4$, as shown in signal 5 of FIG. 6. It is determined in step $S_5$ whether the recording operation is to be finished or not according to the input of the user's stop key signal. If the recording operation is to be continued, the above-explained process is repeated in step $S_5$.

The timing diagrams of the recording interface in accordance with the flowchart for generating the time stamp are signals 4 and 5 of FIG. 6. Here, time stamp generator 202 is designed to have a time stamp field corresponding to every transport packet. signals 4 and 5 of FIG. 6 are input to multiplexer 203 of FIG. 3, and multiplexed through time division to generate signal 6, as shown in FIG. 6.

Figure 7:
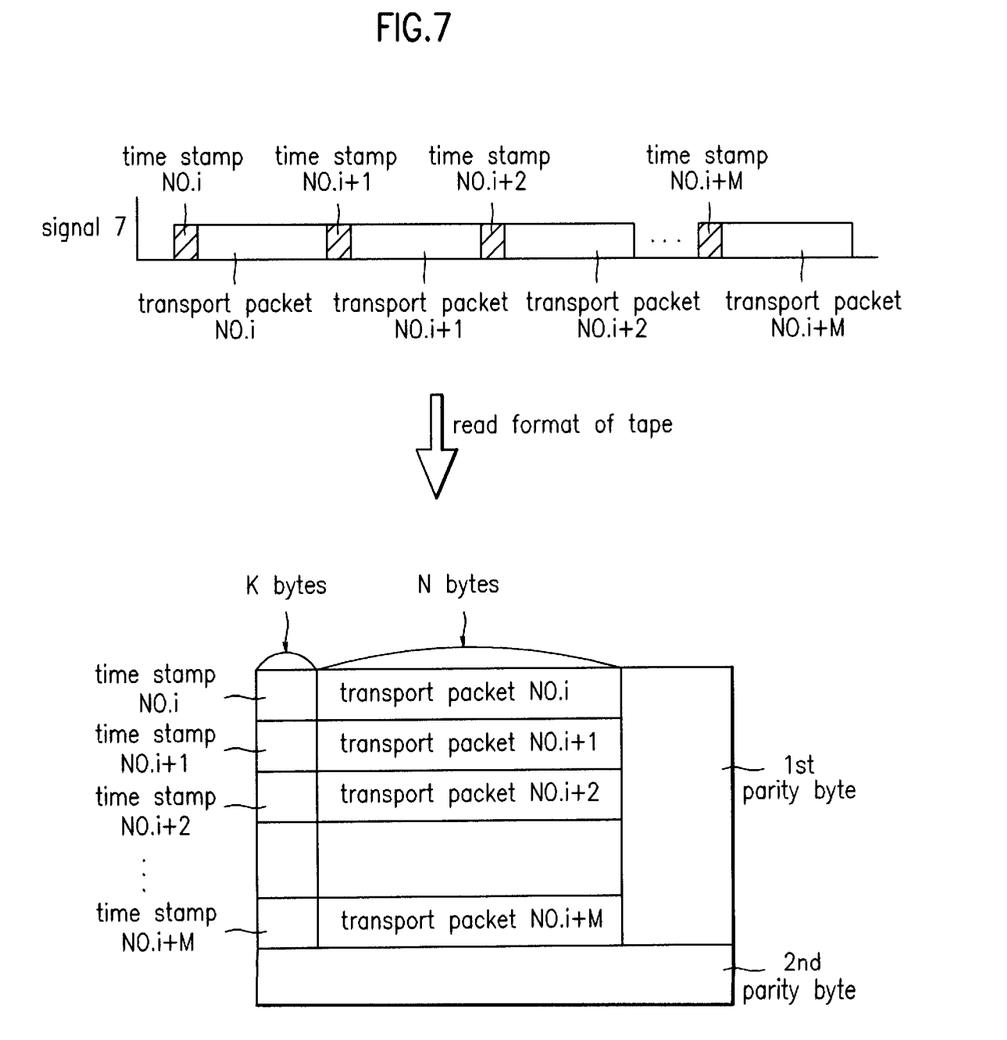
FIG. 7 illustrates a tape recording format of FIG. 3.

Signal 6 output from multiplexer 203 is input to FIFO 204, and then output therefrom to become signal 7 of a constant rate. Signal 7 of FIG. 6 output from FIFO 204 is in a tape recording format for digital VCR 300 suitable for recording, as shown in FIG. 7. A time stamp of K bytes is added as the recording header for the transport packet of N bytes.

The time stamp and transport packet both are protected by error correcting code (ECC) including a first parity byte and a second parity byte which correct errors in a special operation when the data is incorrectly written or perforated. Here, the recording capacity of a cassette is maximized as the K bytes are smaller than N bytes. In the transport bit stream recording apparatus of the digital magnetic recording medium of the present invention, the K bytes are minimized according to the above explained methods.

Second Embodiment

Figure 8:
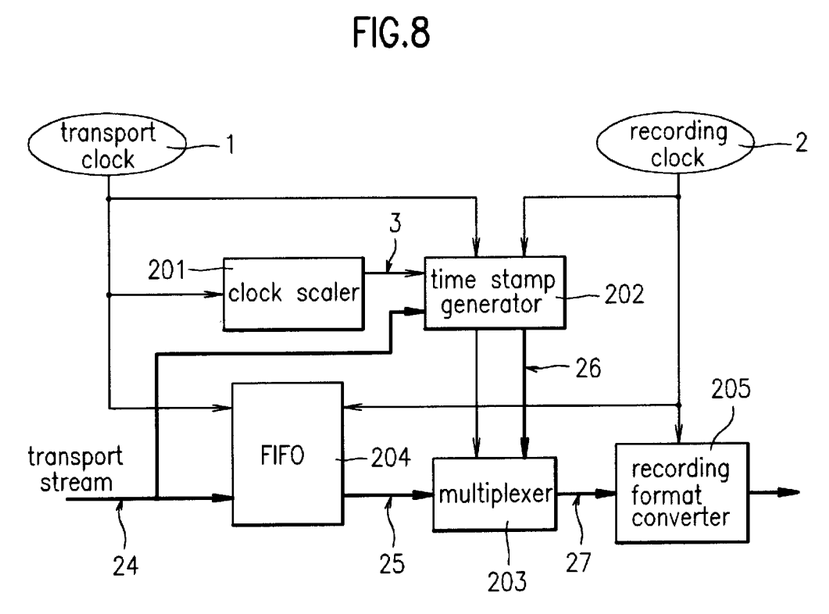
FIG. 8 is a detailed block diagram of a second embodiment of a recording interface of the transport bit stream recording apparatus of digital magnetic recording medium according to the present invention.
Figure 9:
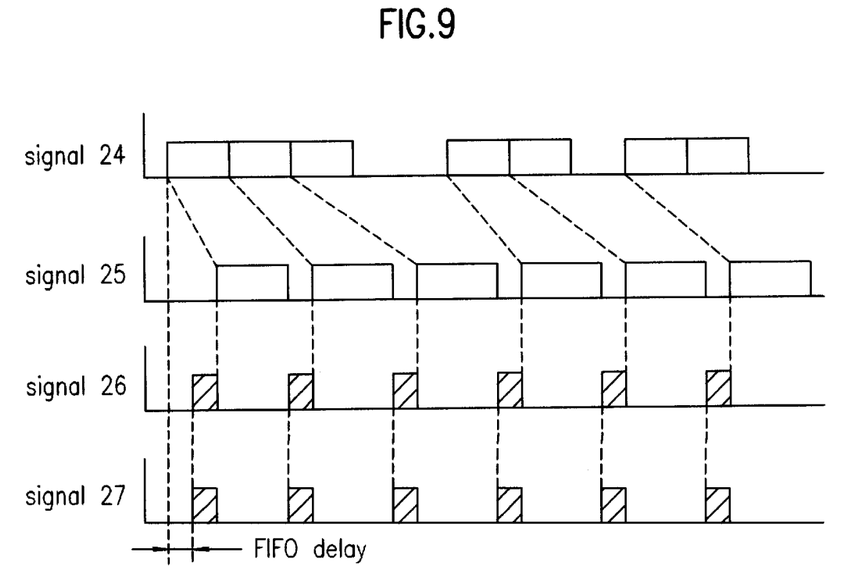
FIG. 9 is an output timing diagram for the respective portions of the recording interface of FIG. 8.

FIG. 8 shows a second embodiment of the recording interface 200 of FIG. 3. FIG. 9 is a signal timing diagram corresponding to FIG. 8. In this embodiment, similar components as in the first embodiment will not be explained.

The second embodiment of the recording interface of the present invention includes a multiplexer 203 that is connected between FIFO 204 and recording format converter 205, which is a distinction from the first embodiment. The second embodiment of the recording interface includes a time stamp generator 202 for generating time stamp information to be used in reproducing a constant rate bit stream recorded in digital VCR 300 (of FIG. 3), a digital recording/reproducing medium, into a variable rate bit stream. A clock scaler 201 outputs a clock signal in which the signal input from transport clock generator 1 is multiplied by a constant N, and generates a clock used in generates a time stamp signal from time stamp generator 202. A FIFO 204 converts the variable rate transport bit stream signal into the constant rate transport bit stream signal. A multiplexer 203 multiplexes the constant rate transport bit stream output from FIFO 204 and the time stamp signal generated from time stamp generator 202 through time division. The operation of the second embodiment of recording interface 200 will be explained below.

The clock signal from transport clock generator 1 is input to clock scaler 201. The input/output signal of clock scaler 201 is a time stamp clock signal for time stamp generator 202 to generate a time stamp, as shown in FIG. 4, for example. Clock scaler 201 is added so that the variable rate bit stream becomes a burst of a series of signals regarded as one unit according to a specific reference in data transport in units of transport packet, that is, a transport unit of N bytes. When the time stamp generated from time stamp generator 202 is counted in transport packet units, the amount of data required in coding the time stamp signal can be reduced. Clock scaler 201 applies the clock for time stamp to time stamp generator 202, which in turn generates a time stamp signal. Signal 24 of FIG. 9 which is the variable rate bit stream is converted through FIFO 24 into signal 25 which is the constant rate bit stream.

The constant rate bit stream signal output from FIFO 24 and the time stamp signal 15 generated from time stamp generator 202 are input to the multiplexer 203 and multiplexed to generate signal 27. The multiplexed constant rate bit stream is recorded on the recording medium of digital VCR 300 via recording format converter 205.

Third Embodiment

Figure 10:
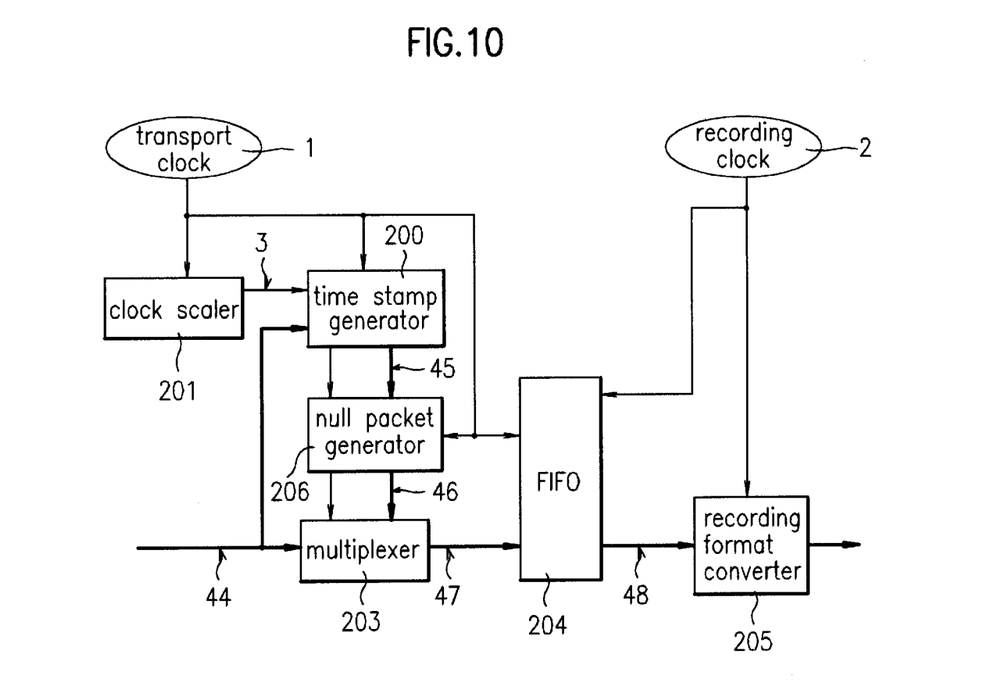
FIG. 10 is a detailed block diagram of a third embodiment of a recording interface of the transport bit stream recording apparatus of digital magnetic recording medium according to the present invention.

FIG. 10 is a block diagram of the third embodiment of the recording interface 200 of the present invention. In this embodiment, similar components as in the first and second embodiments will not be explained in detail.

The third embodiment of the recording interface of the present invention includes a time stamp generator 202 used in reproducing the constant rate bit stream recorded in the digital VCR to the variable rate bit stream, and for generating a time stamp between an empty section of the transport bit stream signal if it is relatively long. A null packet generator 206 generates a null packet corresponding to the time stamp generated from time stamp generator 202, so as to prevent an underflow from being generated from the empty section. A multiplexer 203 multiplexes the transport variable rate bit stream signal and the output signal of null packet generator 206. A FIFO 204 receives the multiplexed signal output from multiplexer 203 and converts it to the constant rate bit stream.

In the first and second embodiments, if an overflow or an underflow occurs when the variable rate bit stream is converted to the constant rate bit stream in FIFO 204, transport packets may be lost where the overflow or underflow is produced. In the third embodiment, however, the size of FIFO 204 is increased to prevent the overflow or underflow. If the size of the FIFO 204 cannot be increased for any reason, the third embodiment may not prevent overflow but it does prevent underflow.

In other words, clock scaler 201, multiplexer 203, recording format converter 205, and FIFO 204 of the third embodiment have similar or same functions as in the first and second embodiments. The null packet generator 206 for preventing underflow is added and the time stamp generator 202 is expanded to generate an additional time stamp signal for preparation for the underflow, in addition to the basic function of generating the time stamp signal according to the flowchart of FIG. 5.

Figure 11:
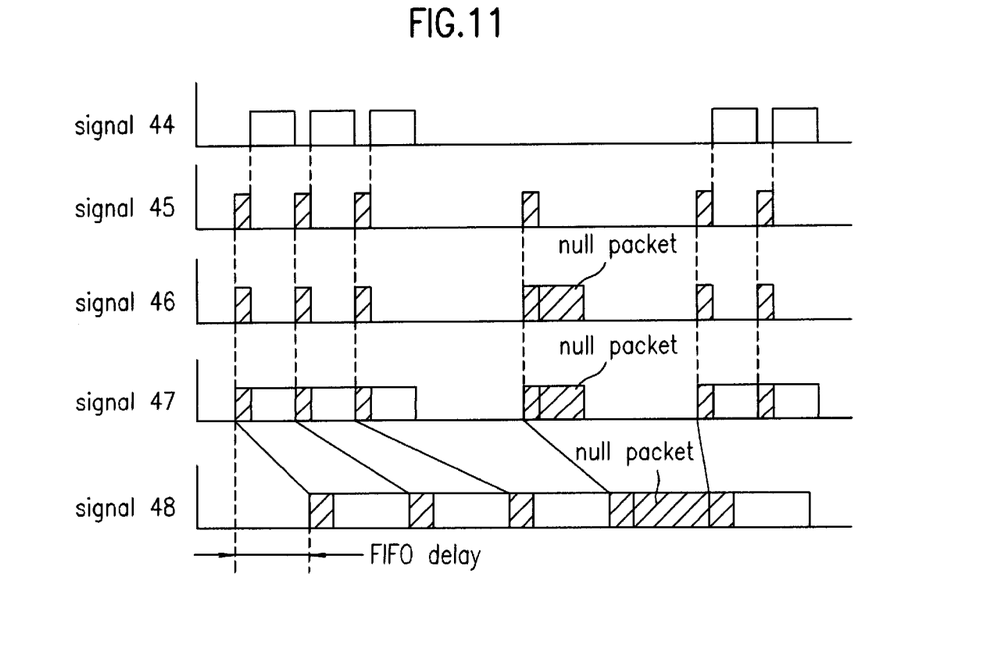
FIG. 11 is an output timing diagram for the respective portions of the recording interface of FIG. 10.

In signal 44 of FIG. 11, which is the transferred variable rate bit stream, if the empty section (where the transport packet is not transferred) is long enough to cause an underflow in FIFO 204 or to surpass the precision range expressed by the time stamp in time stamp generator 202, a time stamp is generated from time stamp generator 202 where if K bits are allocated to the time stamp, transport packets of over $2^K$ are not transferred. The underflow is prevented when the null packet is generated from null packet generator 206 such as signal 46 of FIG. 11 and input to FIFO 204. Here, the null packet is defined by the MPEG-2 standard, and under the MPEG-2 standard, the null packet is a transport packet that is ignored in an MPEG-2 decoder.

FIG. 11 is a timing diagram of the recording interface of FIG. 10. If the empty section in the transferred bit stream is relatively long as in signal 44, a time stamp is generated if the empty section of signal 45 of time stamp generator 202 of FIG. 10 is long enough to cause an underflow in FIFO 204 or to surpass the precision range expressed by the time stamp in the time stamp generator, as explained above.

From null packet generator 206, signal 46 where the null packet is inserted corresponding to the time stamp generated in the empty section is output to multiplexer 203. In multiplexer 203, signals 44 and 46 are multiplexed to output signal 47 to FIFO 204. From signal 47, FIFO 204 outputs signal 48 as a constant rate bit stream including the null packet which is recorded on the magnetic recording medium of digital VCR 300 via recording format converter 205.

Fourth Embodiment

Figure 12:
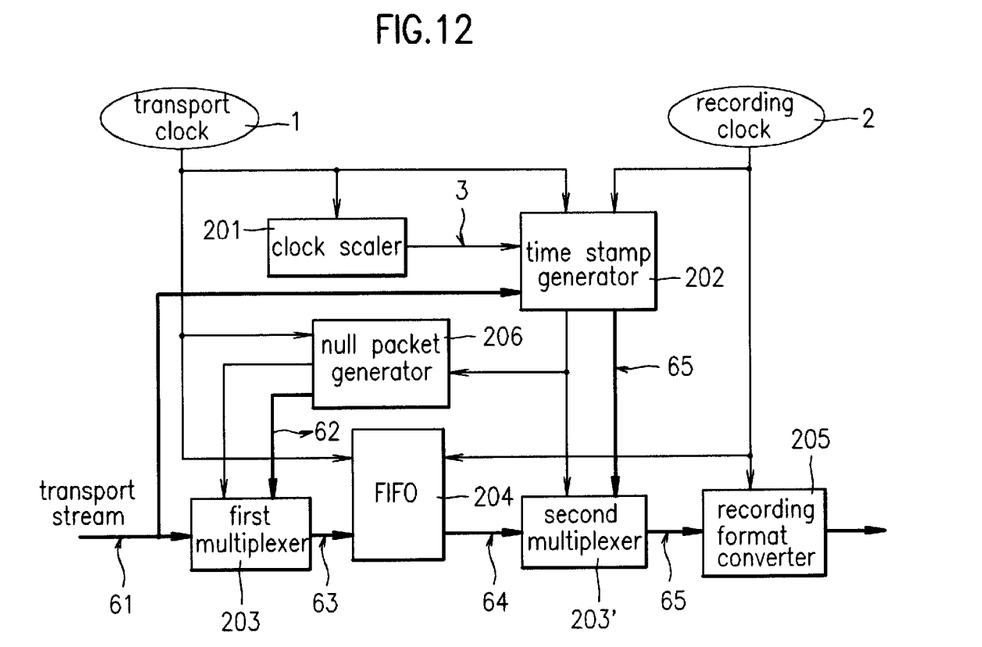
FIG. 12 is a detailed block diagram of a fourth embodiment of a recording, interface of the transport bit stream recording apparatus of digital magnetic recording medium according to the present invention.

FIG. 12 is a block diagram of the fourth embodiment of recording interface 200 of the present invention. In this embodiment, similar components as in the aforementioned embodiments will not be explained in detail.

The fourth embodiment of the recording interface of the present invention includes a first multiplexer 203 for multiplexing a null packet signal output from a null packet generator 206 and a transferred variable rate bit stream signal. A FIFO 204 converts the multiplexed variable rate bit stream output from first multiplexer 203 to a constant rate bit stream. A second multiplexer 203' multiplexes the time stamp signal 65 output from time stamp generator 202 and the signal 64 output from FIFO 204. A recording format converter 205 converts the constant rate bit stream signal output from second multiplexer 203' to a format suitable for recording in digital VCR 300.

The fourth embodiment also addresses underflow generation as in the third embodiment. The fourth embodiment is different from the third embodiment in that time stamp generator 202 is positioned after the output of FIFO 204, and that first and second multiplexers 203 and 203' are provided before and after FIFO 204, respectively.

Time stamp generator 202 generates a time stamp signal according to the time stamp generating flowchart of FIG. 5, and the time stamp signal must be synchronized with the output signal of FIFO 204. Null packet generator 206 generates a null packet for preventing underflow if the empty section of the transferred variable rate bit stream is relatively long, and inserts the null packet into the empty section of the bit stream.

Figure 13:
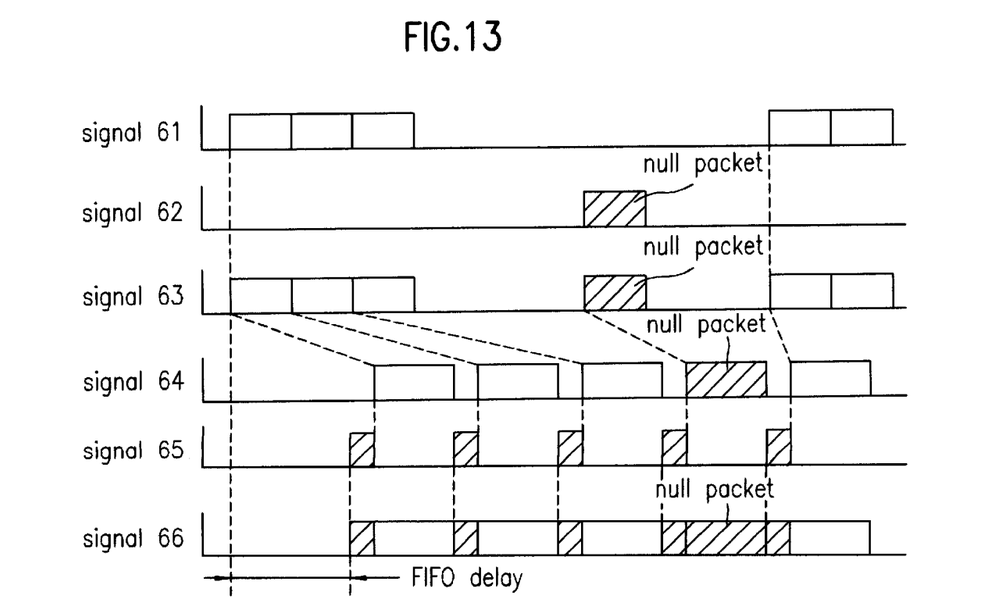
FIG. 13 is an output timing diagram for the respective portions of the recording interface of FIG. 12.

Here, as shown in FIG. 13, if the empty section of the transferred bit stream is relatively long as shown in signal 61, in order to prevent underflow, the null packet is inserted into the empty section as shown in signal 62 in null packet generator 206. Signals 61 and 62 are multiplexed in first multiplexer 203 to generate signal 63. The signal 63 output from first multiplexer 203 is converted to the constant rate bit stream in FIFO 204 and output as signal 64.

Signal 65 generated from time stamp generator 202 and the constant rate signal 64 output from FIFO 204 are multiplexed in second multiplexer 203' to output signal 66. Signal 66 is converted in recording format converter 205 to a format suitable for recording in digital VCR 300, as shown in FIG. 7.

Fifth Embodiment

Figure 14:
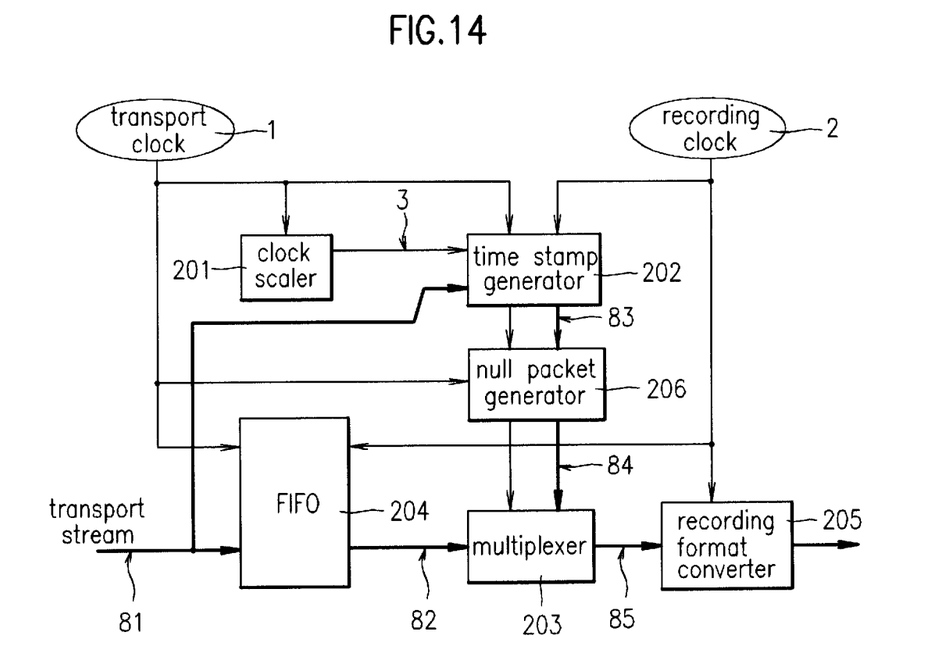
FIG. 14 is a detailed block diagram of a fifth embodiment of a recording interface of the transport bit stream recording apparatus of digital magnetic recording medium according to the present invention.

FIG. 14 shows a fifth embodiment of the present invention, and still another embodiment for the case in which an underflow is generated, as in the third embodiment. The difference is that time stamp generator 202 and multiplexer 203 are positioned at the output stage of FIFO 204 in FIG. 14.

Time stamp generator 202 generates a time stamp signal according to the time stamp generating flowchart of FIG. 5, and the signal output from time stamp generator 202 must be synchronized with the output signal of FIFO 204. Null packet generator 206 generates a null packet if the empty section of the transferred bit stream is relatively long, and inserts the packet into the empty section of the bit stream. The operation of the configuration will be described below with reference to the timing diagram of FIG. 15.

Figure 15:
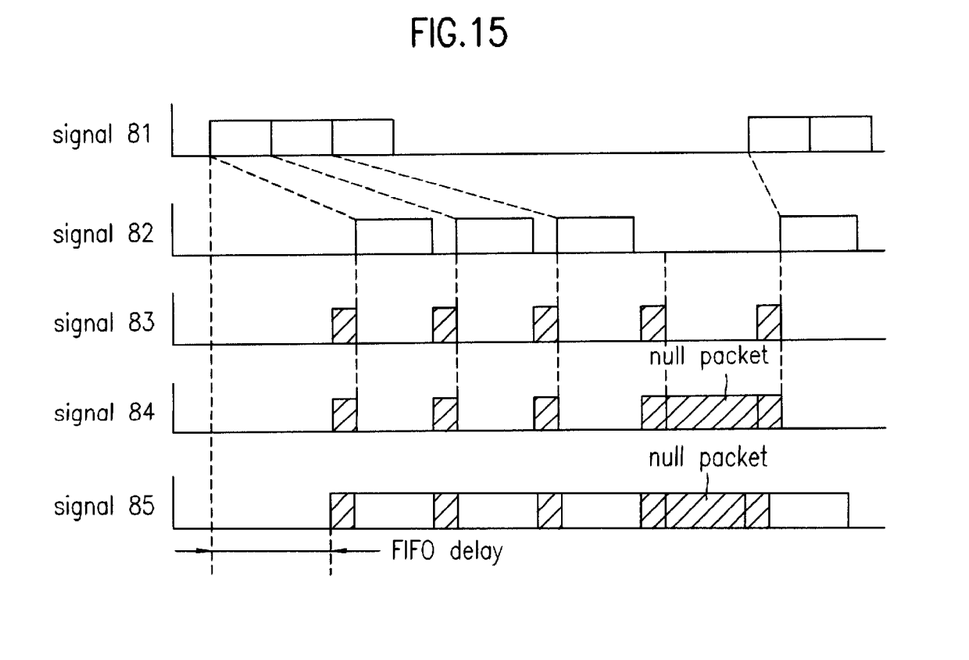
FIG. 15 is an output timing diagram for the respective portions of the recording interface of FIG. 14.

First, if the empty section of the transferred variable rate bit stream is relatively long as shown in signal 81, signal 82 where the position for null packet is emptied while converted into the constant rate bit stream is output from FIFO 204. The null packet generated from null packet generator 206 is added to signal 83, the time stamp signal generated from time stamp generator 202, to thereby generate signal 84.

Signal 84 from null packet generator 206 and signal 82 output from FIFO 204 are multiplexed so that signal 85, a desired constant rate bit stream, is recorded in digital VCR 300.

Hereinafter, preferred embodiments of a transport bit stream reproducing apparatus and its controlling method for a digital magnetic recording medium of the present invention will be described with reference to the attached drawings.

First Embodiment

Figure 16:
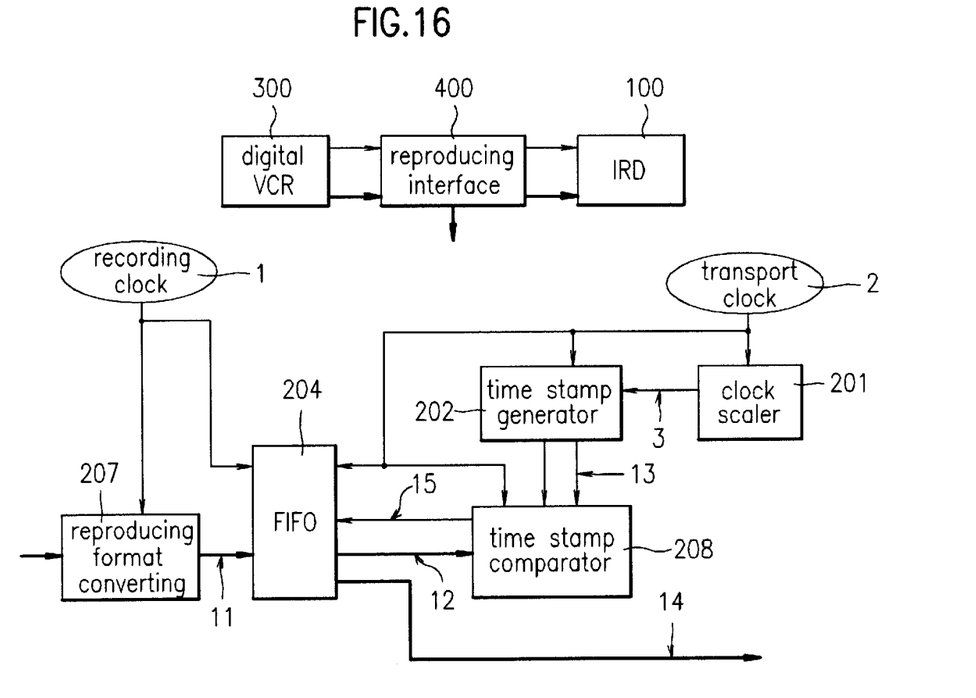
FIG. 16 is a detailed block diagram of a first embodiment of a reproducing interface of the transport bit stream recording apparatus of digital magnetic recording medium according to the present invention.

FIG. 16 is a block diagram of a transport bit stream reproducing apparatus of a digital magnetic recording medium of the present invention, in which the constant rate bit stream recorded in a cassette tape or digital VCR 300 is reversely converted back to the original transport variable rate bit stream to thereby stably recover picture and sound.

Referring to FIG. 16, the first embodiment of the transport bit stream reproducing apparatus of the present invention includes a digital VCR 300 which is one type of hardware for recording a program so that the program can be viewed at a predetermined time after the broadcasting. An IRD 100 receives and decodes a digitally broadcast program, converts it to an analog signal to be displayable through a monitor, and transfers the program digitally with another digital hardware. A reproducing interface 400 reversely converts the constant rate bit stream recorded in digital VCR 300 back to a variable rate bit stream so as to stably recover the picture and sound to IRD 100.

The reproducing interface 400 includes a transport clock generator 1 and a time stamp generator 202 for generating time stamp information used in reproducing the constant rate bit stream recorded in digital VCR 300 to the variable rate bit stream. A clock scaler 201 outputs a clock signal in which the clock signal output from transport clock generator 1 is multiplied by a constant N, and generates a clock used in generating a time stamp in time stamp generator 202. A reproducing format converter 207 converts the format recorded in digital VCR 300 to a format for enabling reproducing or recovery. A FIFO 204 converts the constant rate bit stream output from reproducing format converter 207 to the variable rate bit stream. A time stamp comparator 208 receives the time stamp present within the reproduced variable rate bit stream from FIFO 204, and compares it with the time stamp generated from time stamp generator 202 to thereby control the output of FIFO 204. The reproduced bit stream output from reproducing format converter 207 for converting the constant rate bit stream recorded in digital VCR 300 to a format suitable for its reproduction is input to FIFO 204, and includes the time stamp and transport packet.

According to the control of time stamp comparator 208, a transport packet of N bytes is first extracted, and then the time stamp information of K bytes required in controlling the output of the next transport packet is extracted from FIFO 204. The time stamp information of K bytes extracted from FIFO 204 is compared with the time stamp generated from time stamp generator 202 in time stamp comparator 208 so as to control the time point for extracting the next transport packet from FIFO 204.

Figure 17:
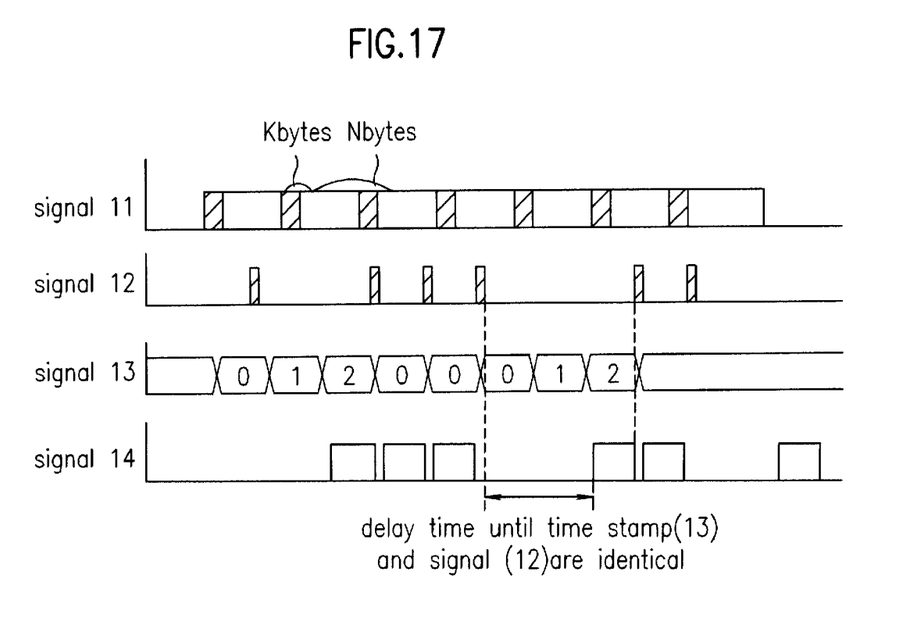
FIG. 17 is an output timing diagram for the respective portions of the reproducing interface of FIG. 16.

FIG. 17 is a timing diagram of the respective portions of FIG. 16, in which reproduction is enabled in signal 11 if the input of reproducing interface 400 is equal to signal 11.

According to the operation of the above stated reproducing interface 400, a transport packet is extracted from FIFO 204 to signal 14, and the time stamp information is extracted from FIFO 204 to signal 12. Signal 12 extracted from FIFO 204 and signal 13 output from time stamp generator 202 are compared in time stamp comparator 208. Here, the extraction of the next transport packet of signal 14 is delayed until the two signals are identical. The next transport packet and time stamp information are extracted when signal 12 extracted from FIFO 204 and signal 13 generated from time stamp generator 202 are identical.

Second Embodiment

Figure 18:
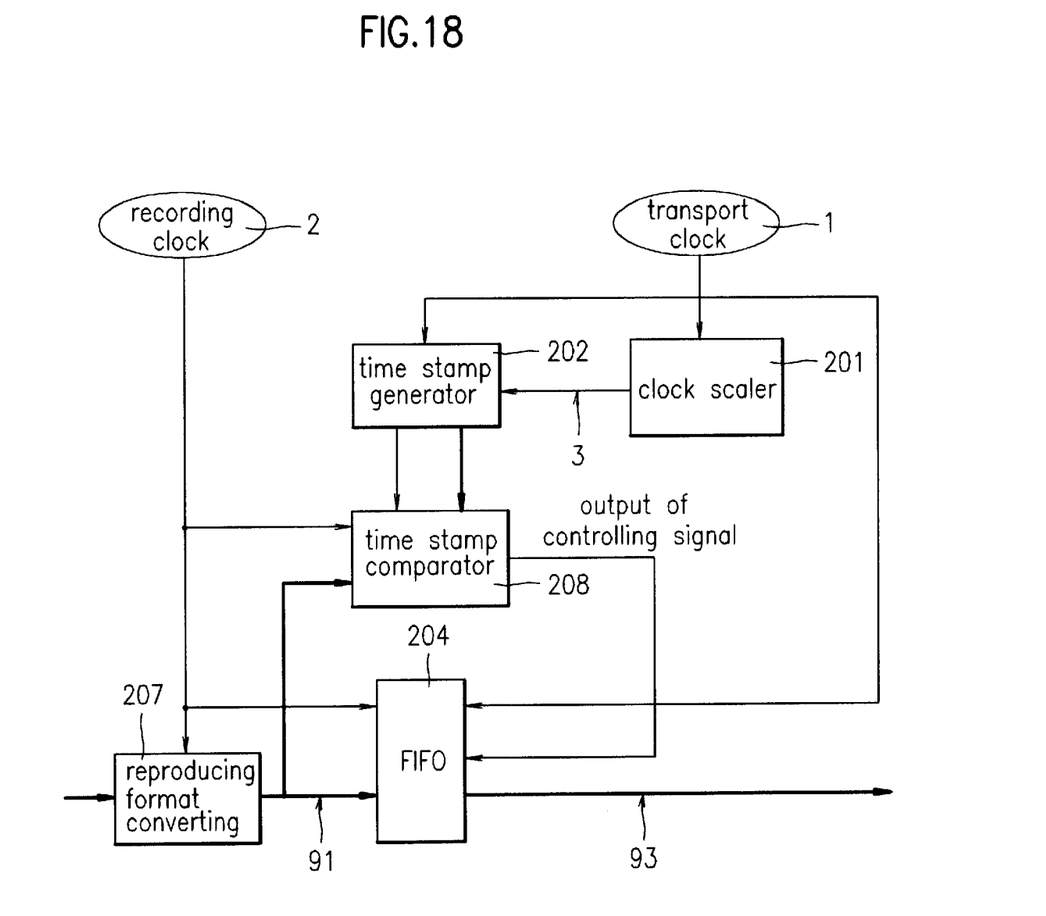
FIG. 18 is a detailed block diagram of a second embodiment of a reproducing interface of the transport bit stream recording apparatus of digital magnetic recording medium according to the present invention.

FIG. 18 shows a second embodiment of the reproducing interface 400 of the transport bit stream reproducing apparatus of the present invention. Similar components as in the first embodiment will not be described below. A difference between the two embodiments is in the positioning of time stamp comparator 208.

In the second embodiment, time stamp comparator 208 compares the time stamp regularly counted in time stamp generator 202 and the time stamp contained in the constant rate bit stream reproduced from reproducing format converter 207.

Figure 19:
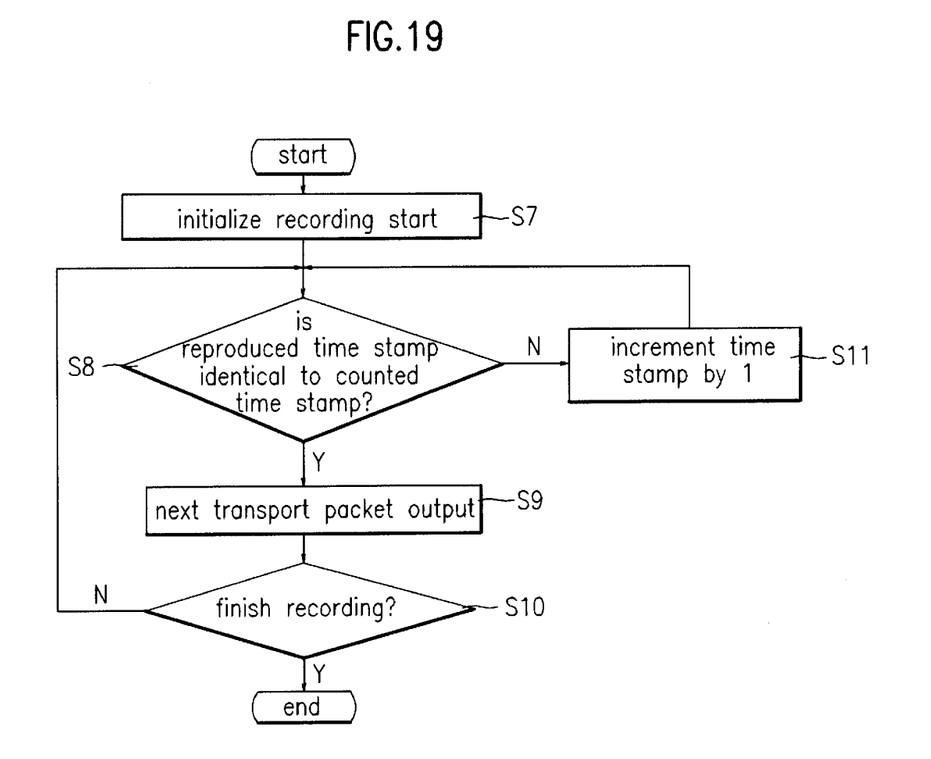
FIG. 19 is a flowchart for generating a time stamp from the time stamp generator of FIG. 18.

FIG. 19 is a flowchart of the operation of time stamp generator 202 of FIG. 18, in which the step of resetting the time stamp to "0" after output is omitted. Referring to FIG. 19, after the step (S7) of initializing recording start, it is determined whether the reproduced time stamp is identical to the counted time stamp in step S8. If the reproduced time stamp is not identical to the counted time stamp, then the counted time stamp is increased by one, for example, in step S11 and step S8 is performed again. If the reproduced time stamp is identical to the counted time stamp in step S8, then the next transport packet is output in step S9. This process ends when the recording is finished. If the recording is not finished (step S10), then step S8 is repeated.

Figure 20:
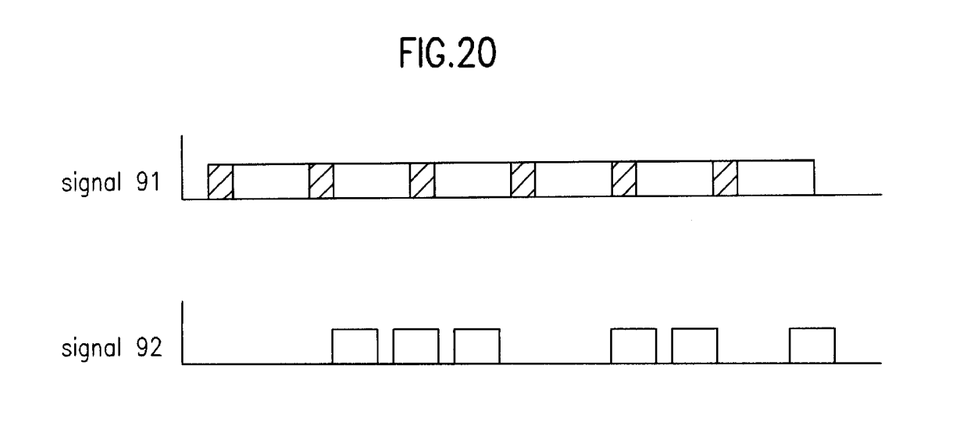
FIG. 20 is an output timing diagram for the respective portions of the reproducing interface of FIG. 18.

If there is no overflow or underflow in FIFO 204, the time stamp difference between nearby transport packets does not surpass $2^k$, where K is the number of bytes allocated to the time stamp and the precision of the time stamp. For this reason, without a time stamp reset, the constant rate bit stream output from reproducing format converter 207 is input to FIFO 204 to be output as the variable rate bit stream, as shown in FIG. 20.

As described above, the bit stream recording/reproducing apparatus and its controlling method of magnetic recording medium of the present invention stably performs reproduction and picture recovery from conversion of a variable rate to a constant rate, and allows compatibility between sets. In addition, the amount of data to be additionally recorded on a cassette tape is minimized to thus maximize the recording capacity of a tape. Further, in reproducing the constant rate bit stream recorded on the tape, it is converted back to the variable rate bit stream equal to the transferred bit stream, to thereby stably recover picture and sound. This invention is advantageous when applied to such hardware as digital VCR for recording or reproducing a broadcast digital bit stream during digital broadcasting such as aerial wave broadcasting, cable broadcasting, and satellite broadcasting, through a variety of media.

It will be apparent those skilled in the art that various modifications and variation can be made in the transport bit stream recording/reproducing apparatus and method of the present invention without departing from the spirit or scope of the invention. Thus, it is intended that the present invention cover the modifications and variations of this invention provided they come within he scope of the appended claims and their equivalents.

What is claimed is:

1. A transport bit stream recording apparatus for a digital recorder comprising:

a transport clock generator generating a predetermined transport clock for a variable rate bit stream;

a time stamp generator coupled to the transport clock generator, the time stamp generator generating time stamp information and adding the time stamp information to the variable rate bit stream;

a clock scaler coupled to the transport clock generator and the time stamp generators, the clock scaler receiving the transport clock signal and generating a scaled signal, the scaled signal corresponding to the transport clock signal divided by N, where N is an integer;

a switching unit coupled to the time stamp generator and combining the variable rate bit stream and time stamp information generated from the time stamp generator;

a storage coupled to the switching unit for storing the variable rate bit stream output from the switching unit, and converting the variable rate bit stream to a constant rate bit stream according to an output control signal; and a recording format converter coupled to the storage and converting the constant rate bit stream output from the storage to a format suitable for recording in the digital recorder.

2. The apparatus as claimed in claim 1, wherein the storage includes an FIFO.

3. A transport bit stream recording apparatus for a digital recorder comprising:

a transport clock generator generating a predetermined transport clock for a variable rate bit stream;

a time stamp generator coupled to the transport clock generator and generating time stamp information and adding the time stamp information to the variable rate bit stream;

a clock scaler coupled to the transport clock generator and the time stamp generator, the clock scaler receiving the transport clock signal and generating a scaled signal, the scaled signal corresponds to the transport clock signal divided by N, where N is an integer;

a storage storing the variable rate bit stream and converting the variable rate bit stream to a constant rate bit stream according to an output control signal;

a switching unit coupled to the storage and the time stamp generator and combining the constant rate bit stream output from the storage and time stamp information generated from the time stamp generator; and a recording format converter coupled to the switching unit and converting the constant rate bit stream output from the switching unit to a format suitable for recording in the digital recorder.

4. The apparatus as claimed in claim 3, wherein the storage includes an FIFO.

5. A transport bit stream recording apparatus for a digital recorder comprising:

a transport clock generator generating a predetermined transport clock for a variable rate bit stream;

a time stamp generator coupled to the transport clock generator and generating a first time stamp information and adding the first time stamp information to the variable rate bit stream and generating a second time stamp information when an empty section of the variable rate bit stream exceeds a predetermined duration;

a clock scaler coupled to the transport clock generator and the time stamp generator, the clock scaler receiving the transport clock signal and generating a scaled signal, the scaled signal corresponding to the transport clock signal divided by N, where N is a integer;

a null packet generator coupled to the time stamp generator generating a null packet corresponding to the second time stamp information generated from the time stamp generator for preventing an underflow in the empty section of the variable rate bit stream signal;

a switching unit coupled to the null packet generator and combining the variable rate bit stream, the first and second time stamp information, and the null packet;

a storage coupled to the switching unit and storing the first and second time stamp information output from the switching unit and the variable rate bit stream, and converting the variable rate bit stream to a constant rate bit stream according to an output control signal; and a recording format converter coupled to the storage and converting the constant rate bit stream output from the storage to a format suitable for recording in the digital recorder.

6. The apparatus as claimed in claim 5, wherein the storage includes an FIFO.

7. A transport bit stream recording apparatus for a digital recorder comprising:

a transport clock generator generating a predetermined transport clock for a variable rate bit stream;

a time stamp generator coupled to the transport clock generator and generating a time stamp information including an empty section time stamp when an empty section of the variable rate bit stream exceeds a predetermine duration;

a clock scaler coupled to the transport clock generator and the time stamp generator, the clock scaler receiving the transport clock signal and generating a scaled signal, the scaled signal corresponding to the transport clock signal divided by N, where N is an integer;

a null packet generator coupled to the time stamp generator and generating a null packet when the empty section of the variable rate bit stream exceeds the predetermined duration to prevent an underflow in the empty section of the variable rate bit stream;

a first switching unit coupled to the null packet generator and combining the output from the null packet generator and the variable rate bit stream;

a storage coupled to the first switching unit and storing the variable rate bit stream added by the null packet and output from the first switching unit, the storage converting the variable rate bit stream to a constant rate bit stream according to an output control signal;

a second switching unit coupled to the storage and the time stamp generator and combining the time stamp information output from the time stamp generator and output signal from the storage; and a recording format converter coupled to the second switching unit and converting the constant rate bit stream output from the second switching unit to a format suitable for recording in the said digital recorder.

8. The apparatus as claimed in claim 7, wherein the storage includes an FIFO.

9. A transport bit stream recording apparatus for a digital recorder comprising:

a transport clock generator generating a predetermined transport clock for a variable rate bit stream;

a time stamp generator coupled to the transport clock generator and generating time stamp information including an empty section time stamp when an empty section of the variable rate bit stream signal exceeds a predetermined duration;

a clock scaler coupled to the transport clock generator and the time stamp generator, the clock scaler receiving the transport clock signal and generating a scaled signal, the scaled signal corresponding to the transport clock signal divided by N, where N is an integer;

a null packet generator coupled to the time stamp generator and generating a null packet corresponding to the empty section time stamp generated from the time stamp generator to prevent an underflow in the empty section of the variable rate bit stream;

a storage storing the variable rate bit stream and converting the variable rate bit stream to a constant rate bit stream according to an output control signal;

a switching unit coupled to the storage and combining the constant rate bit stream output from the storage, the time stamp information, and the null packet output from the null packet generator; and a recording format converter coupled to the switching unit and converting the constant rate bit stream output from the storage to a format suitable for recording in the digital recorder.

10. The apparatus as claimed in claim 9, wherein the storage includes an FIFO.

11. A transport bit stream reproducing apparatus for a digital recorder comprising:

a transport clock generator generating a predetermined transport clock for a variable rate bit stream;

a time stamp generator coupled to the transport clock generator and generating time stamp information for controlling a time point for generating the variable rate bit stream from a constant rate bit stream recorded on the digital recorder;

a clock scaler coupled to the time stamp generator and generating a time stamp clock, the time stamp generator generating the time stamp information corresponding to the time stamp clock;

a reproducing format converter converting a first format recorded in the digital recorder to a second format for reproduction;

a storage coupled to the reproducing format converter and storing the constant rate bit stream output from the reproducing format converter and converting the constant rate bit stream to the variable rate bit stream according to a control signal; and a comparator coupled to the time stamp generator and the storage and comparing a time stamp in the variable rate bit stream output from the storage and a time stamp generated from the time stamp generator to control signal output of the storage.

12. The apparatus as claimed in claim 11, wherein the storage includes an FIFO.

13. A transport bit stream reproducing apparatus for a digital recorder comprising:

a reproducing format converter converting a format recorded in the digital recorder to a reproducing format;

a time stamp generator generating time stamp information for controlling a time point for generating a variable rate bit stream from a constant rate bit stream recorded in the digital recorder;

a clock scaler coupled to the time stamp generator and generating a time stamp clock, the time stamp generator generating the time stamp information corresponding to the time stamp clock;

a storage coupled to the reproducing format converter and storing the constant rate bit stream output from the reproducing format converter and converting the constant rate bit stream to the variable rate bit stream; and a comparator coupled to the time stamp generator and the reproducing format converter, the comparator comparing a time stamp in the variable rate bit stream output from the storage and a time stamp generated from the time stamp generator to control signal output of the storage.

14. The apparatus as claimed in claim 13, wherein the storage includes an FIFO.

15. An apparatus for recording a bit stream in a digital recorder comprising:

a bit stream generator generating a first packet of bit stream;

a first clock generator generating a first clock signal;

a time stamp generator coupled to the first clock generator and producing a time stamp information in accordance with the first clock signal;

a switching unit coupled to the time stamp generator and receiving the time stamp information and the first packet of bit stream, the switching unit outputting a second packet of bit stream combining the first packet and the time stamp information;

a second clock generator generating a second clock signal; and a rate converter coupled to the switching unit and the second clock generator, the rate converter receiving the second packet, converting a bit stream rate of the second packet, and outputting the second packet having the converted bit stream rate in accordance with the second clock signal.

16. The apparatus according to claim 15, further comprising a null packet generator coupled to the time stamp generator and the switching unit, the null packet generator generating a null packet and the time stamp information including a time stamp corresponding to the null packet, the second packet including the null packet.

17. The apparatus according to claim 15, wherein the switching unit includes a multiplexer.

18. The apparatus according to claim 15, wherein the rate converter includes a data storage device.

19. The apparatus according to claim 18, wherein the data storage device includes an FIFO.

20. An apparatus for recording a bit stream in a digital recorder comprising:

a bit stream generator generating a first packet of bit stream;

a first clock generator generating a first clock signal;

a time stamp generator coupled to the first clock generator and producing time stamp information in accordance with the first clock signal;

a second clock generator generating a second clock signal;

a rate converter receiving the first packet of bit stream and converting a bit stream rate of the first packet in accordance with the second clock signal; and a switching unit coupled to the time stamp generator and receiving the time stamp information and the first packet having the converted bit stream rate, the switching unit outputting a second packet of bit stream combining the first packet and the time stamp information.

21. The apparatus according to claim 20, further comprising a null packet generator coupled to the time stamp generator and the switching unit, the null packet generator generating a null packet and the time stamp information including a time stamp corresponding to the null packet, the second packet including the null packet.

22. The apparatus according to claim 20, wherein the switching unit includes a multiplexer.

23. The apparatus according to claim 20, wherein the rate converter includes a data storage device.

24. The apparatus according to claim 20, wherein the data storage device includes an FIFO.

* * * * *